Oct. 27, 1964  F. A. MULLER  3,154,015
MISSILE FLIGHT CONTROL SYSTEM
Filed Sept. 19, 1962  5 Sheets-Sheet 2

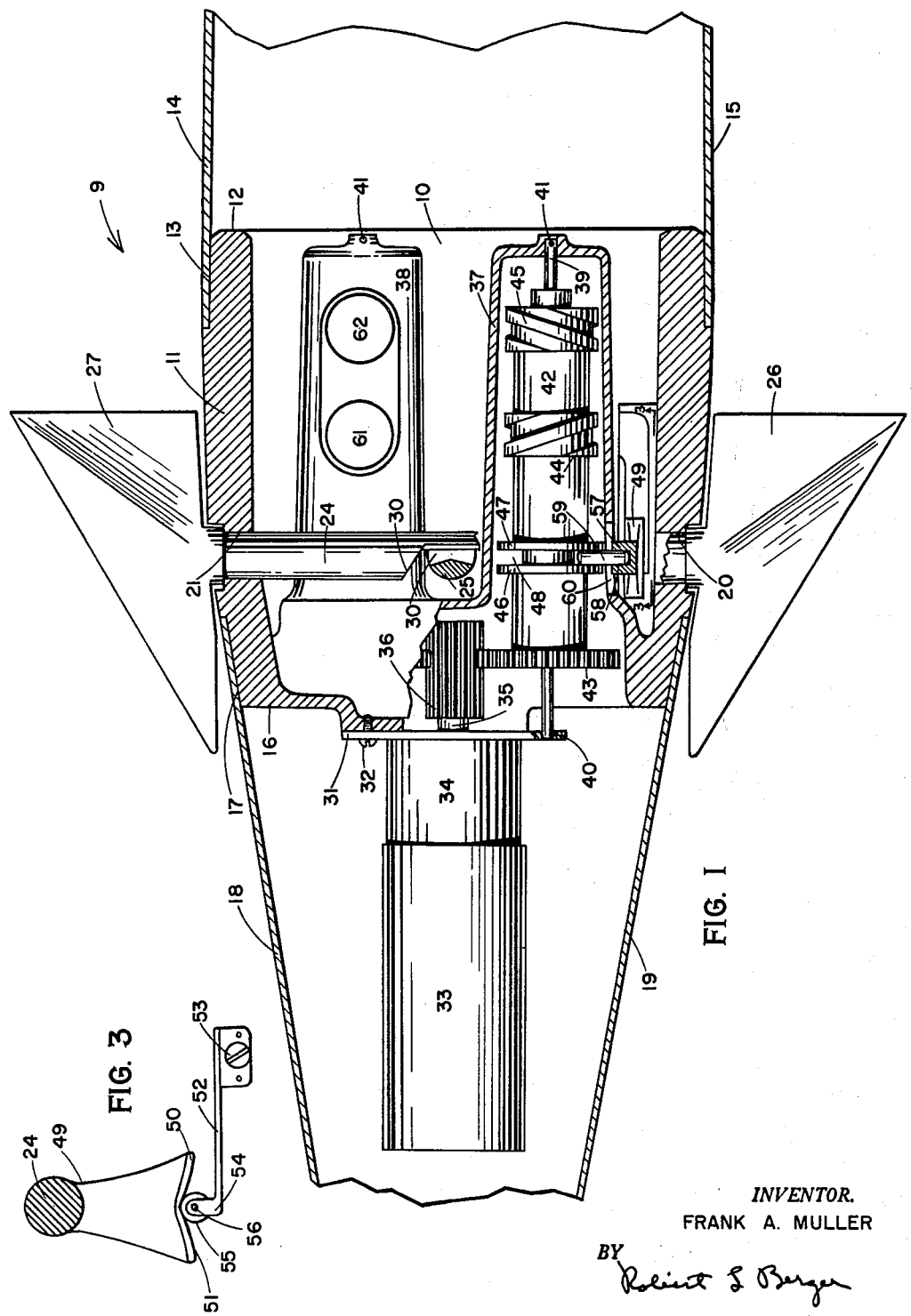

INVENTOR.
FRANK A. MULLER
BY
*Robert S. Dunger*
ATTORNEY

Oct. 27, 1964  F. A. MULLER  3,154,015
MISSILE FLIGHT CONTROL SYSTEM
Filed Sept. 19, 1962  5 Sheets-Sheet 3

INVENTOR.
FRANK A. MULLER
BY
ATTORNEY

Oct. 27, 1964   F. A. MULLER   3,154,015
MISSILE FLIGHT CONTROL SYSTEM
Filed Sept. 19, 1962   5 Sheets-Sheet 4

*INVENTOR.*
FRANK A. MULLER
BY
*Robert E. Berger*
ATTORNEY

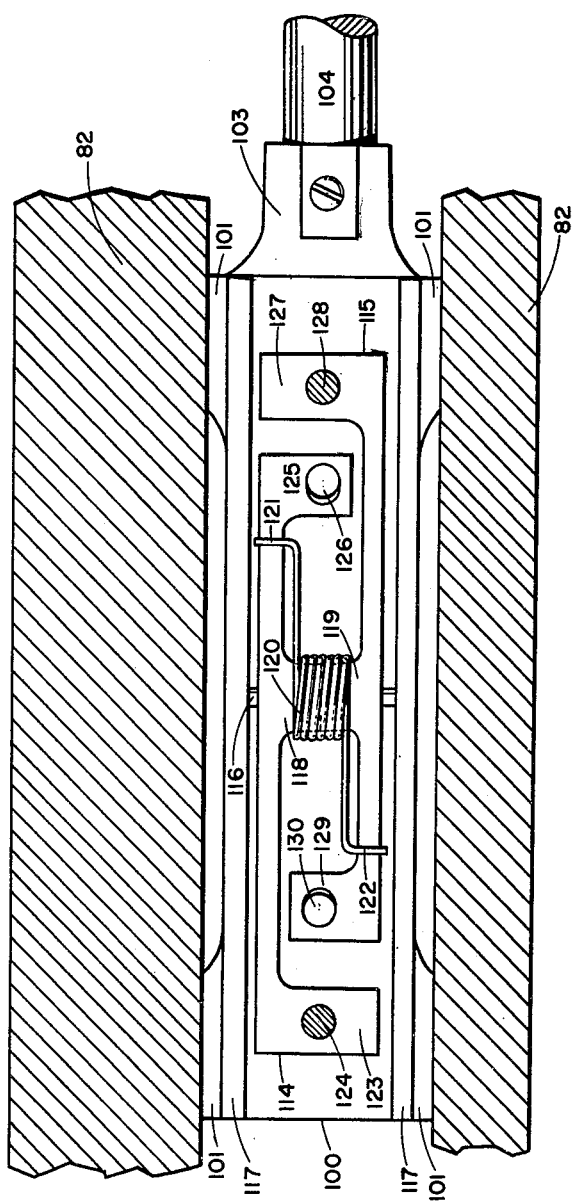

3,154,015
MISSILE FLIGHT CONTROL SYSTEM
Frank A. Muller, Glen Arm, Md., assignor to Martin-Marietta Corporation, Baltimore, Md., a corporation of Maryland
Filed Sept. 19, 1962, Ser. No. 224,637
19 Claims. (Cl. 102—50)

This invention relates to a missile flight control system and more particularly to that type of system in which the control surfaces are either in their neutral position or driven to their fully deflected position to direct the missile on its proper flight course.

The more sophisticated missiles utilize flight control ssytems employing servomechanisms so as to obtain proportional deflection of the missile control surfaces. These systems are expensive to design and produce and, in addition, require fine and delicate adjustments in order to obtain and maintain satisfactory operation. However, many missiles can be controlled on an accurate flight path by the operation of control surfaces which react to "on-off" control signals. In this type of system, the missile travels a straight flight path when its control surfaces are in their neutral positions. A change in direction of the missile's flight path is effected by driving certain of the control surfaces to their full deflection point in response to control signals received from a remote source. After the missile has assumed the new flight path, control signals cause the fully deflected control surfaces to be returned to their neutral positions. This latter type of system is far less expensive than control systems which utilize proportional servomechanisms and, consequently, are employed whenever possible. But even then, "on-off" guidance systems utilized in missiles having relatively small destructive capabilities for operation over relatively short distances must of necessity be constructed of relatively inexpensive parts. The requirement to reduce the cost of these missile flight control systems is a particularly critical consideration when they are to be employed in training versions of more expensive operational weapons.

Numerous systems have heretofore been devised for controlling the path of missiles in response to "on-off" signals. Probably the most commonly used system of this type is that which employs a conventional slip-clutch mechanism to drive the control surfaces. One limitation in these systems is the necessity of providing sufficient power through the clutch to maintain the control surfaces in their fully deflected position, this power requirement being dependent upon the air load torque on the control surfaces. In addition, the fact that this type of system requires a relatively large number of precision parts increasing its cost has forced engineers to look for other means of providing "on-off" flight control. A frequently used alternate system is that which employs gas pressure as its source of power. In this type of system, fluid pressure is provided to the two opposite faces of a piston which is mechanically connected to the control surfaces. The gas passes through solenoid controlled orifices before coming into contact with the faces of the piston, thereby permitting the solenoids to actuate the piston in response to control signals. Being a pyrotechnic device, it is virtually impossible to run a system test on this type of flight control equipment. In addition to being a relatively expensive system when compared to that of the present invention, the fact that the orifices may become clogged with foreign particles during operation makes these pyrotechnic systems unreliable in operation.

It is therefore a primary object of this invention to provide an inexpensive missile flight control system that is extremely reliable in operation. The system herein provided utilizes a minimum number of parts and, consequently, can be packaged in a relatively small envelope. The missile flight control system of the present invention requires few precision parts and eliminates the need for a reverse clutch. In addition, only a small amount of power is necessary to operate the missile control system herein provided which is capable of being completely tested prior to being operationally employed. These and other objects and advantages of this invention will become obvious as the following description of same is read in connection with the accompanying drawings in which:

FIGURE 1 is a side elevation view, partially cut away, illustrating a missile flight control system incorporating the principles of the present invention;

FIGURE 3 is a sectional view taken along line 3—3 of FIGURE 1;

FIGURE 8 is a sectional view taken along line 8—8 in FIGURE 5.

Briefly stated, the primary principle of this invention resides in a continuously rotating cylindrical member which is annularly provided with a pair of spiral cams, the tracks of which progress outwardly towards the ends of the cylindrical member. Spaced apart cam followers alternately engage these spiral cams resulting in displacement of the cam followers and the cylindrical member with respect to each other in either direction along the longitudinal axis of the rotating cylindrical member. This longitudinal displacement is then translated into pivotal movement of a shaft on which missile control surfaces are mounted.

Figure 2:
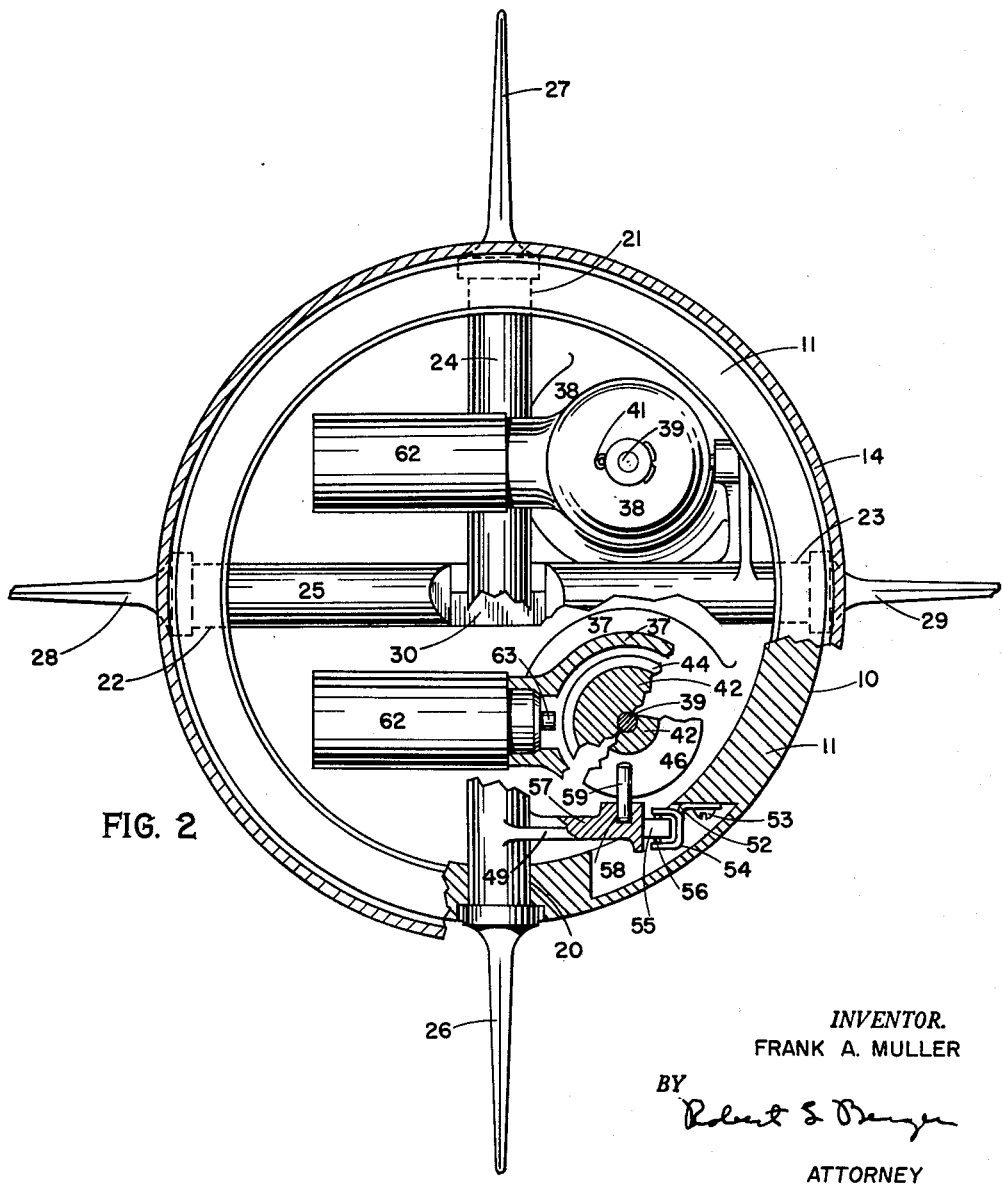
FIGURE 2 is an aft end view, partially cut away, of the missile flight control system illustrated in FIGURE 1.

One embodiment of the present invention is illustrated in FIGURES 1, 2 and 3. Referring first to FIGURE 1 in detail, a portion of a missile 9 is shown and includes a frame member 10 having a cylindrical portion 11, the aft end 12 of which is annularly provided with a recess 13 on the outer periphery thereof. The skin 14 of the missile body 15 is seated on the annular recess 13 of the frame member 10 to connect the frame member to the missile body. The forward end 16 of the frame member 10 is provided with a tapered annular recess 17 on which the skin 18 of the missile nose section 19 is seated to connect the frame member to the missile nose section. As shown in FIGURE 2, four circular bores 20, 21, 22, 23 are provided through the frame member 10, these circular bores being aligned in the same plane and annularly spaced at 90° intervals around the periphery of the frame member. The opposite ends of a canard shaft 24 are rotatably mounted in the cylindrical bores 20 and 21, respectively. Similarly, the opposite ends of a canard shaft 25 are rotatably mounted in the circular bores 22, 23. Attached to the ends of the canard shafts 24, 25 are canards 26, 27 and 28, 29, respectively. The canard shafts 24 and 25 are each provided with a recess 30 to permit their longitudinal axes to lie in the same plane and each shaft to be pivoted about its longitudinal axis.

A motor mounting plate 31, as best seen in FIGURE 1, is connected to the forward end 16 of the frame member 10 by a plurality of screws 32. An electric motor 33 and a gear reduction box 34 are mounted on the motor mounting plate 31 with a driving shaft 35 extending from the gear reduction box 34 into the frame member 10 through openings suitably provided in the motor mounting plate 31 and the forward end 16 of the frame member. A pinion gear 36 is mounted on the driving shaft 35. A pair of actuator housings 37, 38 are included in the frame member 10 and are each provided with a cylindrical bore in parallel relationship with the longitudinal axis of the frame member 10 and missile 9. Located within each actuator housing 37, 38 and extending the length thereof is a shaft 39, one end of which seats in an aperture 40 provided in the motor mounting plate 31 and the other end of which in connected to its associated actuator housing by a pin 41. Rotatably and slideably mounted on the shaft 39 is an actuator 42, one end of which is provided with a spur gear 43 that engages the pinion gear 36. A pair of spiral cams 44, 45 are annularly provided on the actuator 42, the tracks thereof being arranged so as to advance outwardly towards the ends of the actuator 42. Intermediate of the spiral cams 44, 45 and the spur gear 43, the actuator 42 is provided with a pair of spaced annular projections 46, 47 which define an annular groove 48.

As may best be seen in FIGURE 3, each of the canard shafts 24, 25 is provided with a projection 49 which terminates in a flanged portion 50 forming a cammed surface 51. One end of a leaf spring 52 is securely attached to the frame member 10 by a screw 53. The free end of the leaf spring 52 terminates in a U-shaped projection 54 in which a roller 55 is rotatably mounted on a pin 56. The leaf spring 52 urges the roller 55 into contact with the cammed surface 51 to position the canard shaft 24 and its attached canards 26, 27 in their neutral positions when no other external forces are exerted against the canard shaft 24. As seen in FIGURE 1, a cylindrical projection 57 is provided on the projection 49 and includes a circular recess 58 in which one end of a pin 59 is seated, the pin 59 extending through a slot 60 provided in the actuator housing 37 to engage the annular groove 48 of the actuator 42. Longitudinal movement of the actuator 42 on the shaft 39 is translated through the pin 59 into pivotal motion of the shaft 24 on its longitudinal axis.

Mounted to the actuator housing 37 and disposed over the spiral cams 44, 45 respectively, is a pair of solenoids 61, 62, Cooperating with each of the solenoids 61, 62 is a cam follower 63 that is coupled to the plunger of each solenoid, each cam follower being respectively engageable with the spiral cams 44 and 45. When the solenoids 61, 62 are not energized, their respective cam followers 63 are positioned so as not to engage their respective spiral cams 44 and 45; however, when either solenoid is energized, its respective cam follower 63 is extended to become engaged with its respective spiral cam 44 or 45. The actuator mounted within the actuator housing 38 is similarly connected to the canard shaft 25 and similarly provided with a pair of spiral cams which are engageable by solenoid operated cam followers.

Figure 4:
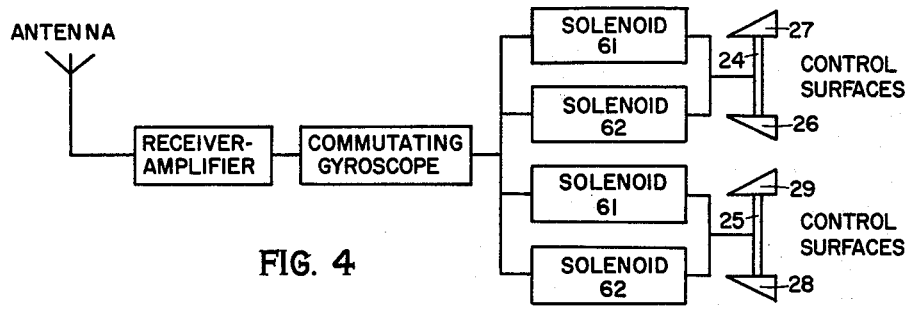
FIGURE 4 is a schematic diagram illustrating the operation of the missile flight control system of the present invention.

The operation of the missile control system illustrated in FIGURES 1, 2 and 3 can best be understood by first referring to FIGURE 4 which is a schematic illustration of system operation. As shown therein, an antenna contained in the missile receives a control signal from a remote source. For example, in the case of an air-to-ground missile, the remote source would most likely be the airplane from which the missile has been fired. The signal received by the antenna is transmitted to a receiver-amplifier and then to a commutating gyroscope. The antenna, receiver-amplifier and commutating gyroscope are devices well known to the prior art and, consequently, do not constitute part of the present invention, having been illustrated only in order to impart a complete understanding of the present invention. After being commutated, the control signal is transmitted as necessary from the commutating gyroscope to the solenoids to position the canards such that the missile is directed towards its target.

While the missile 9 is in flight the motor 33 continually operates to drive the pinion gear 36, which in turn engages the spur gear 43 of the actuator 42 causing the actuator to be continuously rotated on the shaft 39 in a counter-clockwise direction when viewed from its aft end. Whenever the solenoids 61, 62 mounted on the actuator housing 37 are not energized, the canard shaft 24 and its associated canards 26, 27 are positioned in their neutral positions by the force exerted by the leaf spring 52 against the cammed surface 51. In addition, since the actuator 42 is connected by the pin 59 to the cylindrical projection 57 of the projection 49 on the shaft 24, the actuator 42 is also positioned in its neutral position on the shaft 39 with the spiral cams 44, 45 rotating directly under their respective solenoids 61, 62. Upon the receipt of a control signal energizing solenoid 61, its associated cam follower 63 engages the spiral cam 44. The rotational movement of the spiral cam 44 causes the actuator 42 to be longitudinally displaced in a forward direction on the shaft 39 until the engaged cam follower 63 has traveled completely through the track of the spiral cam 44 and is positioned against the aft edge thereof. This longitudinal displacement of the actuator 42 in the forward direction is translated through the pin 59 and the projection 49 to the shaft 24 to pivot the shaft 24 upon its longitudinal axis in a clockwise direction when viewed as shown in FIGURE 1. The canards 26, 27 being attached to the ends of the canard shaft 24 are simultaneously pivoted in a clockwise direction, It will be noted that the force exerted by the spiral cam 44 upon the cam follower 63 of the solenoid 61 as the cam follower travels through the track of the spiral cam 44 must be sufficient to overcome the force exerted on the shaft 24 by the action of the leaf spring 52 and the aerodynamic forces exerted on the canards 26, 27. However, after the canards 26, 27 have been driven to their fully deflected position, power is not required from the motor 33 to maintain them in that position. This is true due to the fact that the cam follower 63 of the solenoid 61 is acting against the aft face of the spiral cam 44 at that time.

When the solenoid 61 becomes de-energized its associated cam follower 63 becomes disengaged from the spiral cam 44 and the force of the spring 52 acts through the cammed surface 51 to return the canard shaft 24 and its associated canards 26, 27 to their neutral positions. Simultaneously the force of the leaf spring 52 acting through the cammed surface 51 on the pin 59 causes the actuator 42 to be returned to its neutral position on the shaft 39.

When the solenoid 62 mounted on the actuator housing 37 is energized upon receipt of a control signal from the commutating gyroscope, its associated cam follower 63 is extended to become engaged with the spiral cam 45. This cam follower 63 travels along the track of the spiral cam 45 causing the actuator 42 to be displaced longitudinally in an aft direction on the shaft 39. This longitudinal displacement of the actuator 42 is translated by the pin 59 through the projection 49 into a counter-clockwise rotation of the shaft 24 and its associated canards 26, 27. When the cam follower 63 of the solenoid 62 reaches the end of the track of the spiral cam 45, the actuator 42 is maintained in a fixed displaced position and the canards 26, 27 in their fully deflected position by the cam follower 63 acting against the forward edge of the spiral cam 45. Again it will be noted that the force exerted by the spiral cam 45 against the cam follower 63 of the solenoid 62 must be sufficient to overcome the forces transmitted to the canard shaft 24 by the spring 52 and the aerodynamic forces on the canards 26, 27 only until the cam follower 63 has progressed to the end of the track of the spiral cam 45. When the solenoid 62 becomes de-energized its associated cam follower 63 becomes disengaged from the spiral cam 45 and the force of the leaf spring 52 acting on the canard shaft 24 and the actuator 42 as previously described returns the canards 26, 27 and the actuator 42 to their neutral positions. The solenoids 61, 62 mounted on the actuator housing 38 and their associated cam followers and actuator cooperate in a similar manner to position the canards 28, 29 in either their neutral position, their fully deflected clockwise position or their fully deflected counterclockwise position. By thus positioning the canards 26, 27, 28, 29 in response to the control signals received from a source remote from the missile 9, the missile is readily guided on an accurate flight path.

In normal operation a missile flight control system is energized by a battery carried within the missile. Due to space and weight considerations it is naturally desirable that the missile flight control system have a minimum power requirement. In the missile control system described above, the electric motor 33 supplies power to continuously rotate the actuator 42 during flight. However, the flight control system provided herein has a distinct and important advantage over systems employing a slip-clutch drive in that the motor maximum torque is required only during the time that the canards are actually being rotated and is not required to maintain the canards in their fully deflected positions.

It will be observed from the drawings and from the above description of the missile flight control system provided that this system requires a minimum number of parts when compared to the flight control systems of the prior art. In addition, the various parts of the system herein provided require a minimum of close tolerance or precision machining. These factors permit the production of a flight control system having a maximum reliability at minimum cost. Also the fact that this missile flight control system has a minimum of parts results in an extremely light-weight system which can be packaged in a small envelope.

It will be apparent that the missile flight control system of the present invention inherently possesses rapid response characteristics and, in addition, the response characteristics of the system can be controlled over broad limits by varying the cam speed with gear ratio changes, by varying the lead of the cam itself or by varying the electrical characteristics of the solenoids.

The mechanism employed in this missile flight control system permits operation without the necessity of a pre-launch warm up. By energizing the solenoids from an external power source the control package can be subjected to a bench test both prior to and after installation in the missile.

Figure 5:
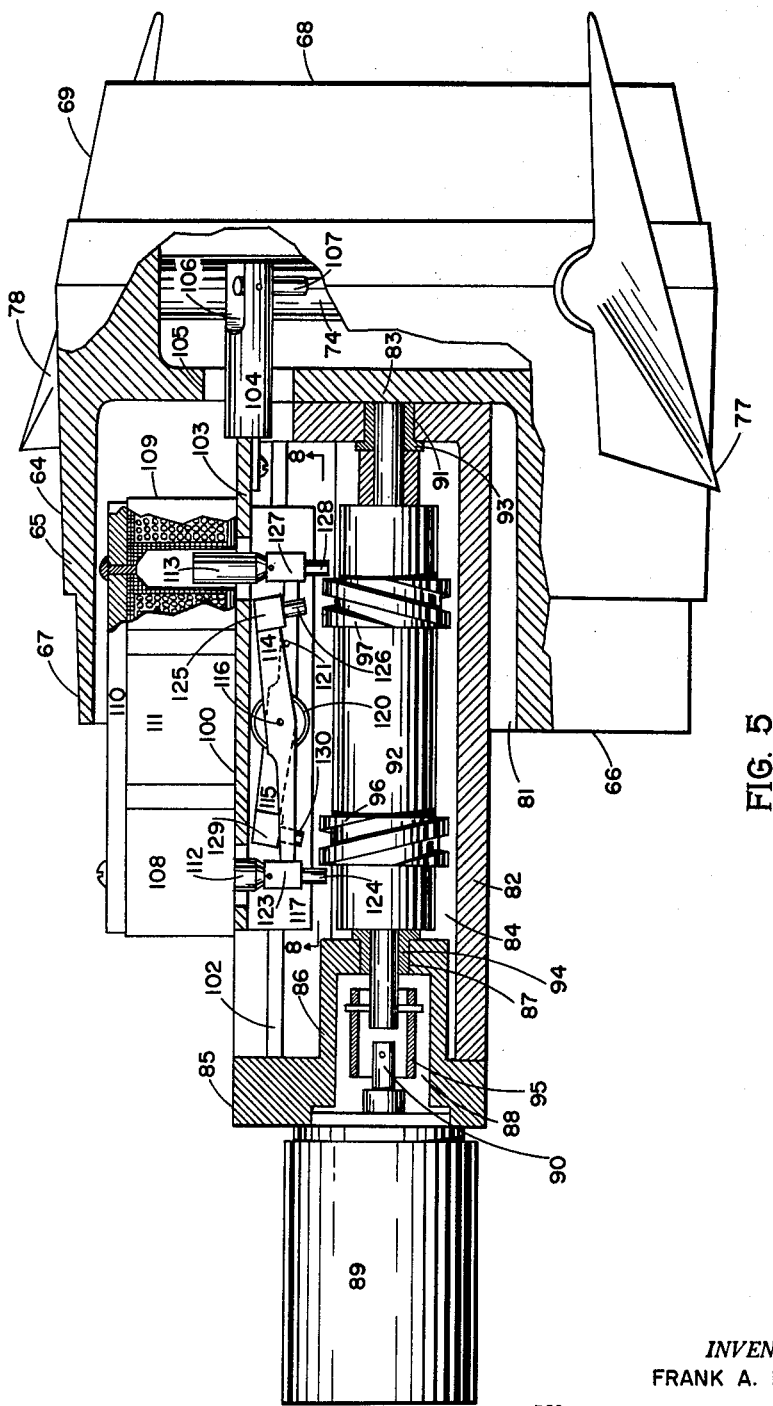
FIGURE 5 is a side elevation view, partially cut away, of a second embodiment of the present invention.
Figure 6:
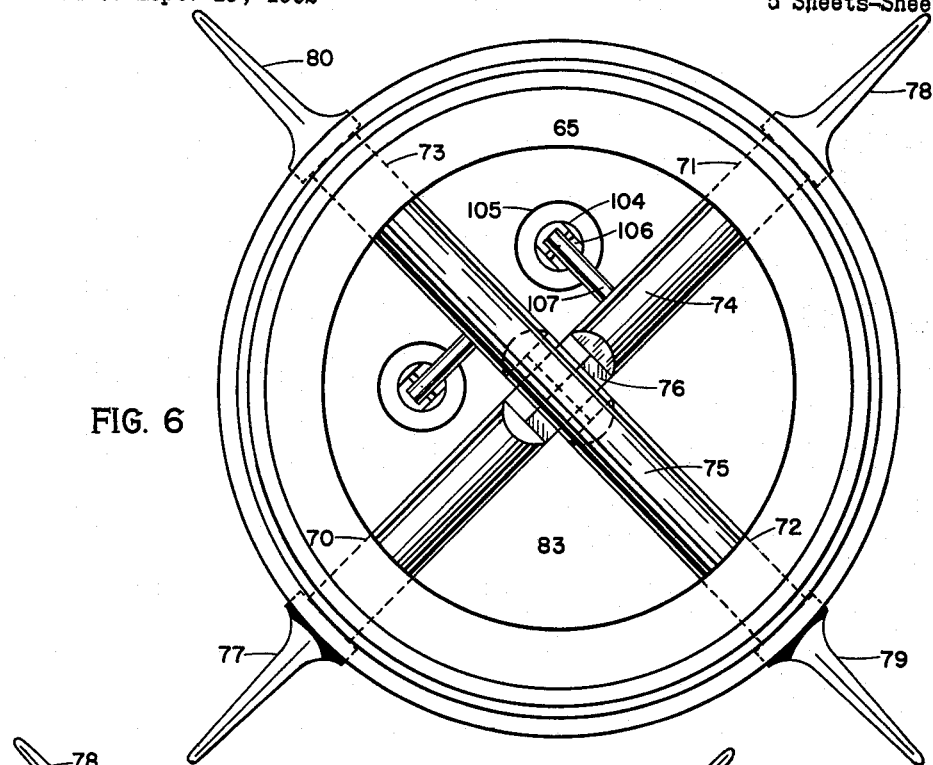
FIGURE 6 is a forward end view of the embodiment of the present invention illustrated in FIGURE 5.

Another embodiment of the present invention is illustrated in FIGURES 5, 6, 7, and 8. Referring first to FIGURE 5, a frame member 64 is shown which includes a cylindrical portion 65. The aft end 66 of the frame member 64 is annularly provided with a recess 67 to receive the skin of the missile body so that the frame member may be connected to the body of the missile. The forward end 68 of the frame member 64 is annularly provided with a tapered recess 69 to receive the skin of the missile nose section so that the frame member may be connected to the nose section of the missile. As may best be seen in FIGURE 6, the frame member 64 is provided with four circular bores 70, 71, 72, 73 which are located in the same plane and annularly spaced at 90° intervals around the periphery of the frame member. The ends of a canard shaft 74 are journaled in the circular bores 70, 71 of the frame member 64. Journaled in the circular bores 72, 73 of the frame member 64 are the ends of a canard shaft 75. The canard shafts 74, 75 are provided with recesses 76 to permit them to be located in the same plane and each to be pivoted about its longitudinal axis. The ends of the canard shafts 74, 75 are provided with canards 77, 78 and 79, 80, respectively.

Figure 7:
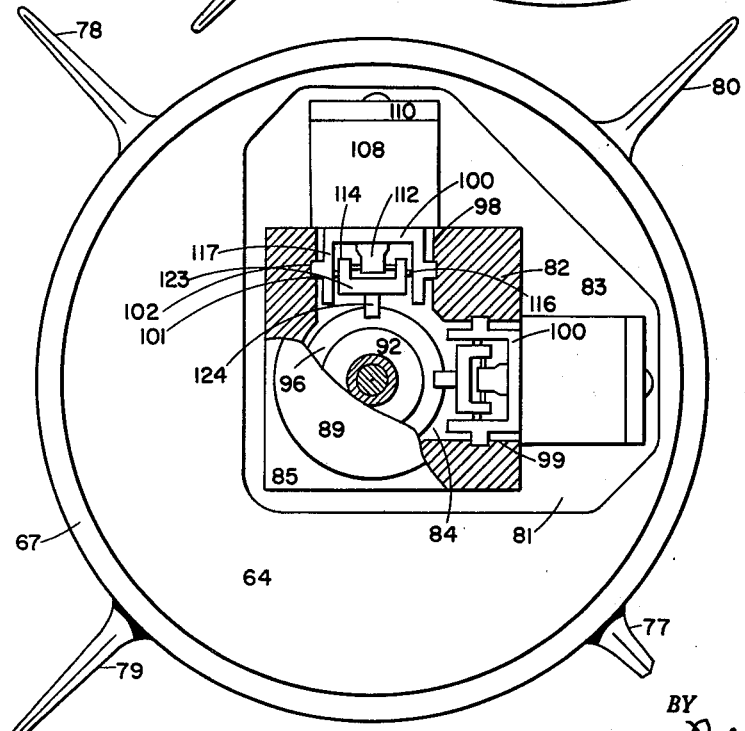
FIGURE 7 is an aft end view, partially cut away of the embodiment of the present invention illustrated in FIGURE 5.

As shown in FIGURES 5 and 7, the aft end 66 of the frame member 64 is provided with a recess 81 to receive an actuator housing 82, which has its forward end mounted to a cross member 83 of the frame member 64 and which is provided with a cylindrical recess 84. A motor mounting plate 85 is connected to the aft end of the actuator housing 82 and provided with a forwardly extending projection 86 having a circular bore 87 in the forward end thereof. The aft end of the motor mounting plate 85 is provided with a larger circular bore 88 which connects with the circular bore 87. An electric motor and gear reduction unit 89 is mounted on the motor mounting plate 85 with its driving shaft 90 extending into the circular bore 88.

The forward end of the actuator housing 82 is provided with a circular bore 91. A cylindrical member 92 is disposed within the circular recess 84 of the actuator housing 82, having one end thereof rotatably mounted within a bearing 93 which is seated in the circular bore 91, and the other end thereof extending through the circular bore 87 and rotatably mounted to a bearing 94 seated in the circular bore 87. The cylindrical member 92 is connected to the driving shaft 90 by a coupling 95. Annularly provided on the cylindrical member 92 are a pair of spiral cams 96 and 97, the tracks of which progress outwardly towards the ends of the cylindrical member.

The actuator housing 82 is further provided with a pair of longitudinal apertures 98, 99 which are disposed normally with respect to each other and which connect with the cylindrical recess 84. A carriage 100 is slideably mounted within each aperture 98, 99 of the actuator housing 82 by having projections 101 which engage grooves 102 provided in the actuator housing. The carriage 100 includes an extended portion 103 to which a rod 104 is connected. This rod 104 extends through an aperture 105 suitably provided in the cross member 83 of the frame member 64 and has a slot 106 in its forward end to receive one end of a pin 107. This end of the pin 107 is pivotably connected to the rod 104 and has its other end rigidly connected to the canard shaft 74. It will thus be seen that, as the carriage 100 is caused to slide in the grooves 102, the canard shaft 74 will be pivoted about its longitudinal axis. The carriage 100 disposed within the longitudinal aperture 99 of the actuator housing 82 is similarly connected to the canard shaft 75 to cause it to pivot on its longitudinal axis as that carriage is caused to slide longitudinally with respect to the actuator housing 82.

Mounted on the outside face of each carriage 100 is a pair of solenoids 108, 109 which are supported in spaced relationship by a plate 110 and a spacing member 111. Upon being energized, the solenoids 108, 109 act to retract their respective plungers 112, 113 towards the plate 110.

A pair of actuator arms 114, 115 are journaled to a pin 116 which in turn is connected to and disposed between two side members 117 of the carriage 100. As shown in FIGURE 8, the actuator arms 114, 115 include inwardly depending cylindrical projections 118 and 119, respectively, which abut and around which a spring 120 is coiled. One end 121 of the spring 120 urges the actuator arm 114 in a counterclockwise direction as viewed in FIGURE 5, while the other end 122 of the spring 120 urges the actuator arm 115 in a clockwise direction as viewed in FIGURE 5. Again referring to FIGURE 8, one end of the actuator arm 114 terminates in a U-shaped flange 123 which receives and is pivotably connected to the plunger 112 of the solenoid 108. The face of the U-shaped flange 123 which is adjacent to the cylindrical member 92 is provided with a cam follower 124 located so as to be engageable with the spiral cam 96. The opposite end of the actuator arm 114 terminates in a flanged portion 125 which is provided with a cam follower 126 disposed so as to be engageable with the spiral cam 97. Similarly, one end of the actuator arm 115 terminates in a U-shaped flange 127 which receives and is pivotably connected to the plunger 113 of the solenoid 109. The face of the U-shaped flange 127 which is adjacent to the cylindrical member 92 is provided with a cam follower 128 located so as to be engageable with the spiral cam 97. The opposite end of the actuator arm 115 terminates in a flanged portion 129 which is provided with a cam follower 130 located so as to be engageable with the spiral cam 96. The system is designed so that the cam followers 124, 128 contact the outer edges of the spiral cams 96 and 97, respectively, when the canards 77 and 78, the shaft 74 and the carriage 100 are all in their neutral positions.

In operation, the electric motor and gear reduction unit 89 continually drives the cylindrical member 92 about its longitudinal axis in a clockwise direction when viewed as shown in FIGURE 7. Upon the receipt of a control signal by the solenoid 108 from the commutating gyroscope, the solenoid is energized to retract the plunger 112 towards the plate 110 thereby withdrawing the cam follower 124 from contact with the aft edge of the spiral cam 96 and bringing the cam follower 126 into contact with the track of the spiral cam 97, overcoming the force exerted on the actuator arm 114 by the spring 120. The carriage 100 is now free to move in a forward direction as the cam follower 126 progresses through the track of the spiral cam 97. This forward motion of the carriage 100 is translated through the rod 104 and the pin 107 into pivotal motion of the shaft 74 about its longitudinal axis in a clockwise direction as viewed in FIGURE 5. When the cam follower 126 reaches the end of the track of the spiral cam 97, it acts against the forward edge of the spiral cam 97 to maintain the canards 77, 78 in their fully deflected position. When the control signal which energized the solenoid 108 is cut off, the spring 120 causes the actuator arm 114 to rotate in a counterclockwise direction as viewed in FIGURE 5 thereby disengaging the cam follower 126 from contact with the forward edge of the spiral cam 97 and engaging the cam follower 124 with the spiral cam 96. As the cam follower 124 progresses along the track of the spiral cam 96, the carriage 100 moves in an aft direction with respect to the actuator housing 82 to a point at which the carriage 100, the canard shaft 74 and the canards 77, 78 have been returned to their neutral positions. After these members have been returned to their neutral positions, the cam followers 124, 128 are again in contact with the outer edges of the spiral cams 96 and 97, respectively, thereby locking these members in their said neutral positions.

Upon receipt of a control signal energizing the solenoid 109, the plunger 113 is retracted in a direction towards the plate 110 overcoming the force exerted on the actuator arm 115 by the spring 120. The cam follower 128 becomes disengaged from the forward edge of the spiral cam 97 and the cam follower 130 engages the spiral cam 96. As the cam follower 130 progresses along the track of the spiral cam 96, the carriage 100 is caused to move in an aft direction with respect to the actuator housing 82. This aft motion of the carriage 100 is translated through the rod 104 and the pin 107 to rotate the shaft 74 in a counterclockwise direction about its longitudinal axis as viewed in FIGURE 5. When the cam follower 130 has completely progressed through the track of the spiral cam 96, it contacts the outer edge thereof, thereby retaining the canards 77, 78 in their fully deflected counterclockwise position as long as the solenoid 109 is energized by the control signal. When the control signal is discontinued de-energizing the solenoid 109, the force exerted on the actuator arm 115 by the spring 120 causes the cam follower 130 to become disengaged from the outer edge of the spiral cam 96 and the cam follower 128 to become engaged with the spiral cam 97. As the cam follower 128 travels along the track of the spiral cam 97, the carriage 100 moves in a forward direction with respect to the actuator housing 82 thereby causing the canard shaft 74 and the canards 77, 78 to be rotated in a clockwise direction as viewed in FIGURE 5. When the cam follower 128 has completed its travel along the track of the spiral cam 97, forward motion of the carriage 100 and rotational motion of the shaft 74 and the canards 77, 78 ceases, these members having been returned to their neutral positions. The cam followers 124, 128 continue to contact the outer edges of the spiral cam 96 and 97, respectively, thereby retaining the canards 77, 78 in their neutral positions until such time as another control signal energizes the solenoid 108 or the solenoid 109.

The carriage 100 disposed in the longitudinal aperture 99 of the actuator housing 82 and its associated solenoids, actuator arms, etc., operate in response to control signals from the commutating gyroscope in a manner similar to that described above to position the canards 79, 80 in their neutral position, their fully deflected clockwise position or their fully deflected counterclockwise position. By thus positioning the canards 77, 78, 79, 80 in response to the control signals received from a source remote from the missile, the missile is readily guided on an accurate flight path.

It will be noted that, in the second embodiment of the present invention described above, no centering springs are required to return the canards to their neutral position after they have been deflected therefrom. It will also be apparent that this second embodiment of the present invention, like the first, requires a minimum of parts when compared to flight control systems of the prior art and that the various parts thereof require a minimum of close tolerance or precision machining.

This invention may be embodied in other ways without departing from the spirit or characteristics thereof. For example, the actuator arms of the second embodiment of the invention described above could be employed to drive an actuator similar to that provided in the first embodiment of the invention described above. Also, while the two embodiments of the invention described herein employ an electric motor energy source, a number of other energy sources would provide satisfactory operation. These alternate energy sources could, for example, be a mechanical motor type spring, a hot gas powered turbine or a ram air wheel. The embodiments of the invention described herein are therefore to be considered as in all respects illustrative and not restrictive, the scope of the invention being indicated by the appended claims, and all changes which come within the meaning and range of equivalency of the claims are intended to be embraced therein.

The invention claimed is:

1. In an actuator mechanism, an improvement comprising:
   (a) a frame;
   (b) a cylindrical cammed member mounted to said frame so as to be free to rotate about the longitudinal axis of said cammed member and being annularly provided with a first and a second spiral cam spaced from each other along said longitudinal axis, the tracks of said first and said second spiral cams progressing in opposite directions along said longitudinal axis;
   (c) means for rotating said cylindrical cammed member; and (d) a first and a second cam follower independently engageable with said first and said second spiral cams, respectively, said cam followers and said cylindrical cammed member being displaced in one direction with respect to each other along said longitudinal axis when said first cam follower is engaged with said first spiral cam and said cam followers and said cylindrical cammed member being displaced in the opposite direction with respect to each other along said longitudinal axis when said second cam follower is engaged with said second spiral cam.

2. The apparatus of claim 1 including additionally a second means for positioning said cam followers and said cylindrical cammed member in a pre-selected relationship longitudinally along said longitudinal axis when both of said cam followers are disengaged from their respective said spiral cams.

3. The apparatus of claim 2 wherein said second means includes a spring.

4. The apparatus of claim 2 wherein said second means includes a third and a fourth cam follower, said third cam follower being operable to engage said second spiral cam when said first cam follower is disengaged from said first spiral cam and said fourth cam follower being operable to engage said first spiral cam when said second cam follower is disengaged from said second spiral cam.

5. In an actuator mechanism, an improvement comprising:
  (a) a frame;
  (b) a cylindrical cammed member mounted to said frame so as to be free to rotate about the longitudinal axis of said cammed member and being annularly provided with a first and a second spiral cam spaced from each other along said longitudinal axis, the tracks of said first and said second spiral cams progressing in opposite directions along said longitudinal axis;
  (c) means for rotating said cylindrical cammed member; and
  (d) a first and a second cam follower independently engageable with said first and second spiral cams respectively, one of a group of members consisting of said cam followers and said cylindrical cammed member being fixed from movement along said longitudinal axis, to cause the second member of said group of members to become displaced in one direction along said longitudinal axis when said first cam follower is engaged with said first spiral cam and to cause said second member of said group of members to become displaced in the other direction along said longitudinal axis when said second cam follower is engaged with said second spiral cam.

6. In an actuator mechanism including a shaft and a frame, said shaft being journaled to said frame, an improvement comprising:
  (a) a second shaft mounted to said frame with the longitudinal axis of said second shaft normal to and spaced from said longitudinal axis of said first shaft;
  (b) a cylindrical actuator mounted on said second shaft in a manner permitting said cylindrical actuator to rotate on said second shaft and to slide on said second shaft in either direction parallel to said longitudinal axis of said second shaft, said cylindrical actuator being annularly provided with a first and a second spiral cam spaced from each other along the longitudinal axis of said cylindrical actuator, the tracks of said first and said second spiral cam progressing in opposite directions along said longitudinal axis of said cylindrical actuator;
  (c) a first means for rotating said cylindrical actuator on said second shaft;
  (d) a first and a second cam follower independently engageable with said first and said second spiral cams, respectively, said cylindrical actuator being displaced in one direction longitudinally along said second shaft when said first cam follower is engaged with said first spiral cam and said cylindrical actuator being displaced in the opposite direction longitudinally along said second shaft when said second cam follower is engaged with said second spiral cam;
  (e) a second means for independently engaging said first cam follower with said first spiral cam and second cam follower with said second spiral cam; and
  (f) a third means connecting said first shaft to said cylindrical actuator whereby said first shaft is caused to pivot on its longitudinal axis as said actuator is displaced longitudinally along said second shaft.

7. The apparatus of claim 6 with additionally a fourth means including a resilient member for returning said first shaft to said neutral position and thereby positioning said actuator in a neutral position on said second shaft when both of said cam followers are disengaged from their respective said spiral cams.

8. The apparatus of claim 7 wherein said fourth means comprises:
  (a) a projection formed integrally with and normal to said first shaft;
  (b) a cammed flanged portion provided on said projection; and
  (c) a spring having one end thereof connected to said frame and a roller rotatably connected to the free end thereof, said spring exerting a force on said cammed flanged portion of said projection through said roller.

9. In an actuator mechanism including a shaft and a frame, said shaft being journaled to said frame, an improvement comprising:
  (a) a cylindrical cammed member rotatably mounted to said frame with the longitudinal axis of said cylindrical cammed member normal to said longitudinal axis of said shaft, said cylindrical cammed member being annularly provided with a first and a second spiral cam spaced from each other along said longitudinal axis of said cylindrical cammed member, the tracks of said first and said second spiral cam progressing in opposite directions along said longitudinal axis of said cylindrical cammed member;
  (b) a first means for rotating said cylindrical cammed member;
  (c) a carriage slideably connected to said frame;
  (d) a first and a second cam follower mounted from said carriage and independently engageable with said first and said second spiral cams, respectively, said carriage being displaced longitudinally in one direction with respect to said cylindrical cammed member when said first cam follower is engaged with said first spiral cam and said carriage being displaced longitudinally in the opposite direction with respect to said cylindrical cammed member when said second cam follower is engaged with said second spiral cam;
  (e) a second means for independently engaging said first cam follower with said first spiral cam and said second cam follower with said second spiral cam; and
  (f) a third means connecting said shaft to said carriage whereby said shaft is caused to pivot on its longitudinal axis as said carriage is displaced longitudinally with respect to said cylindrical cammed member.

10. The apparatus of claim 9 with additionally a fourth means including a resilient member for returning said shaft to said neutral position and thereby positioning said carriage in a neutral position with respect to said cylindrical cammed member when both of said cam followers are disengaged from their respective said spiral cams.

11. The apparatus of claim 10 wherein said fourth means includes additionally a third and a fourth cam follower, said third cam follower being operable to engage said second spiral cam when said first cam follower is disengaged from said first spiral cam and said fourth cam follower being operable to engage said first spiral cam when said second cam follower is disengaged from said second spiral cam.

12. In a missile flight control system having a control surface disposed on both ends of a shaft journaled to a frame to pivot about its longitudinal axis in either direction from a neutral position, and means for receiving and commutating flight control signals from a remote source, the combination therewith comprising:
   (a) a cylindrical cammed member mounted to said frame so as to be free to rotate about the longitudinal axis of said cammed member and being annularly provided with a first and a second spiral cam spaced from each other along said longitudinal axis of said cylindrical cammed member, the tracks of said first and said second spiral cam progressing in opposite directions along said longitudinal axis of said cylindrical cammed member;
   (b) a first means for rotating said cylindrical cammed member;
   (c) a first and a second cam follower independently engageable with said first and said second spiral cams, respectively, said cam followers and said cylindrical cammed member being displaced in one direction with respect to each other along said longitudinal axis of said cylindrical cammed member when said first cam follower is engaged with said first spiral cam and said cam followers and said cylindrical cammed member being displaced in the opposite direction with respect to each other along said longitudinal axis of said cylindrical cammed member when said second cam follower is engaged with said second spiral cam;
   (d) a second means for translating the relative motion between said cam followers and said cylindrical cammed member into pivotal movement of said shaft; and
   (e) a third means for engaging said cam followers with said respective spiral cams, said third means being responsive to said commutated control signals.

13. The apparatus of claim 12 with additionally a fourth means including a resilient member for returning said one of said pair of shafts to said neutral position and thereby longitudinally positioning said cam followers and said cylindrical cammed member neutrally with respect to each other when both of said cam followers are disengaged from their respective said spiral cams.

14. In a missile flight control system having a control surface disposed on both ends of each of a pair of shafts journaled to a frame to pivot about their longitudinal axes in either direction from a neutral position, said shafts being aligned in the same plane and disposed normally to each other, and means for receiving and commutating flight control signals from a remote source, the combination with each one of said pair of shafts thereof, comprising:
   (a) a third shaft mounted to said frame with the longitudinal axis of said third shaft normal to and spaced from said longitudinal axis of said one of said pair of shafts;
   (b) a cylindrical actuator mounted on said third shaft in a manner permitting said cylindrical actuator to rotate on said third shaft and to slide on said third shaft in either direction parallel to said longitudinal axis of said third shaft, said cylindrical actuator being annularly provided with a first and a second spiral cam spaced from each other along the longitudinal axis of said cylindrical actuator, the tracks of said first and said second spiral cam progressing in opposite directions along said longitudinal axis of said cylindrical actuator;
   (c) a first means for rotating said cylindrical actuator on said third shaft;
   (d) a first and a second cam follower independently engageable with said first and said second spiral cams, respectively, said cylindrical actuator being displaced in one direction longitudinally along said third shaft when said first cam follower is engaged with said first spiral cam and said cylindrical actuator being displaced in the opposite direction longitudinally along said third shaft when said second cam follower is engaged with said second spiral cam;
   (e) a second means for independently engaging said first cam follower with said first spiral cam and said second cam follower with said second spiral cam, said second means being responsive to said commutated control signals; and
   (f) a third means connecting said one of said pair of shafts to said actuator whereby said one of said pair of shafts is caused to pivot on its longitudinal axis as said actuator is displaced longitudinally along said third shaft.

15. The apparatus of claim 14 with additionally a fourth means including a resilient member for returning said one of said pair of shafts to its said neutral position and thereby positioning said actuator in a neutral position on said third shaft when both of said cam followers are disengaged from their respective said spiral cams.

16. The apparatus of claim 15 wherein said fourth means comprises:
   (a) a projection formed integrally with and normal to said one of said pair of shafts;
   (b) a cammed flanged portion provided on said projection; and
   (c) a spring having one end thereof connected to said frame and a roller rotatably connected to the free end thereof, said spring exerting a force on said cammed flanged portion of said projection through said roller.

17. In a missile flight control system having a control surface disposed on both ends of each of a pair of shafts journaled to a frame to pivot about their longitudinal axes in either direction from a neutral position, said shafts being disposed normally to each other, and means for receiving and commutating flight control signals from a remote source, the combination therewith comprising:
   (a) a cylindrical cammed member rotatably mounted to said frame with the longitudinal axis of said cylindrical cammed member normal to said longitudinal axes of said pair of shafts, said cylindrical cammed member being annularly provided with a first and a second opposed spiral cam spaced from each other along said longitudinal axis of said cylindrical cammed member, the tracks of said first and said second spiral cam progressing in opposite directions along said longitudinal axis of said cylindrical cammed member;
   (b) a first means for rotating said cylindrical cammed member;
   (c) a carriage in combination with each one of said pair of shafts slideably connected to said frame;
   (d) a first and a second cam follower mounted from said carriage and independently engageable with said first and said second spiral cams, respectively, said carriage being displaced longitudinally in one direction with respect to said cylindrical cammed member when said first cam follower is engaged with said first spiral cam and said carriage being displaced longitudinally in the opposite direction with respect to said cylindrical cammed member when said second cam follower is engaged with said second spiral cam;
   (e) a second means for independently engaging said first cam follower with said first spiral cam and said second cam follower with said second spiral cam, said second means being responsive to said commutated control signals; and
   (f) a third means connecting said one of said pair of shafts to said carriage whereby said one of said pair of shafts is caused to pivot on its longitudinal axis as said carriage is displaced longitudinally with respect to said cylindrical cammed member.

18. The apparatus of claim 17 with additionally a fourth means including a resilient member for returning said one of said pair of shafts to its said neutral position and thereby positioning said carriage in a neutral position with respect to said cylindrical cammed member when both of said cam followers are disengaged from their respective said spiral cams.

19. The apparatus of claim 18 wherein said fourth means includes additionally a third and a fourth cam follower, said third cam follower being operable to engage said second spiral cam when said first cam follower is disengaged from said first spiral cam and said fourth cam follower being operable to engage said first spiral cam when said second cam follower is disengaged from said second spiral cam.

No references cited.